US008555105B2

(12) United States Patent
Goodwin et al.

(10) Patent No.: US 8,555,105 B2
(45) Date of Patent: Oct. 8, 2013

(54) FALLOVER POLICY MANAGEMENT IN HIGH AVAILABILITY SYSTEMS

(75) Inventors: James A. Goodwin, Austin, TX (US); Manjunath B. Muttur, Kolar Gold Fields, IN (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 12/758,078

(22) Filed: Apr. 12, 2010

(65) Prior Publication Data

US 2011/0252272 A1 Oct. 13, 2011

(51) Int. Cl.
*G06F 11/00* (2006.01)

(52) U.S. Cl.
USPC .............................................. 714/1; 714/6.12

(58) Field of Classification Search
USPC .............................................................. 714/1
See application file for complete search history.

(56) References Cited

U.S. PATENT DOCUMENTS

| | | | | |
|---|---|---|---|---|
| 6,944,787 | B2 * | 9/2005 | Allen et al. | 714/4.4 |
| 6,959,331 | B1 | 10/2005 | Traversat | |
| 6,963,994 | B2 * | 11/2005 | Allen et al. | 714/4.4 |
| 7,039,827 | B2 * | 5/2006 | Meyer et al. | 714/4.11 |
| 7,093,013 | B1 * | 8/2006 | Hornok et al. | 709/224 |
| 7,100,070 | B2 * | 8/2006 | Iwamura et al. | 714/4.4 |
| 7,146,523 | B2 * | 12/2006 | Allen et al. | 714/6.31 |
| 7,246,256 | B2 * | 7/2007 | De La Cruz et al. | 714/4.11 |
| 7,389,293 | B2 * | 6/2008 | Chan et al. | 1/1 |
| 7,418,627 | B2 * | 8/2008 | Baba | 714/24 |
| 7,457,236 | B2 * | 11/2008 | Cheng et al. | 370/220 |
| 7,464,302 | B2 * | 12/2008 | Chen et al. | 714/47.1 |
| 7,490,268 | B2 * | 2/2009 | Keromytis et al. | 714/38.11 |
| 7,640,451 | B2 * | 12/2009 | Meyer et al. | 714/4.11 |
| 7,681,088 | B2 * | 3/2010 | Chen et al. | 714/47.1 |
| 7,783,914 | B1 * | 8/2010 | Havemose | 714/4.11 |
| 7,971,099 | B2 * | 6/2011 | Coffey et al. | 714/36 |
| 2002/0091753 | A1 * | 7/2002 | Reddy et al. | 709/202 |
| 2003/0167421 | A1 * | 9/2003 | Klemm | 714/37 |
| 2005/0172161 | A1 * | 8/2005 | Cruz et al. | 714/4 |
| 2006/0090097 | A1 * | 4/2006 | Ngan et al. | 714/6 |
| 2006/0117212 | A1 * | 6/2006 | Meyer et al. | 714/4 |

(Continued)

OTHER PUBLICATIONS

IBM—"High Availability Cluster Multi-POrocessing for AIX", Administration Guide, (IBM HACMP for AIX Version 6.1 Nov. 2009).

(Continued)

*Primary Examiner* — Kamini Patel
(74) *Attorney, Agent, or Firm* — David Mims; Mark P Kahler

(57) ABSTRACT

The method determines whether a particular node of a high availability cluster is functioning properly or is a failed node. The method dumps node process state information as a dump data for the failed or crashed node in a shared storage area of the high availability cluster. A high availability cluster manager identifies the dump data that corresponds to the failed node as the most recent dump data for that failed node. The high availability cluster manager interrogates the dump data using kernel debugger services to identify a process trace and thereby identify the crash-causing application for the failed node. The method determines if the dump data includes a process match for the failed node process. The high availability cluster manager may initiate a crash-causing application notification to administrators or other entities of the high availability cluster. The method provides relocation and restoration capability of applications from the failed node to a fallover node and returns those application resources to the user and other entities using the high availability cluster.

20 Claims, 4 Drawing Sheets

(56) References Cited

U.S. PATENT DOCUMENTS

| | | | | |
|---|---|---|---|---|
| 2006/0143547 | A1* | 6/2006 | Haaks et al. | 714/47 |
| 2006/0149797 | A1* | 7/2006 | Chai et al. | 707/204 |
| 2006/0149997 | A1* | 7/2006 | Chai et al. | 714/6 |
| 2006/0195745 | A1* | 8/2006 | Keromytis et al. | 714/741 |
| 2006/0253725 | A1* | 11/2006 | Chen et al. | 714/4 |
| 2007/0168058 | A1 | 7/2007 | Kephart | |
| 2007/0180289 | A1* | 8/2007 | Chai et al. | 714/4 |
| 2007/0245167 | A1* | 10/2007 | De La Cruz et al. | 714/4 |
| 2008/0172679 | A1* | 7/2008 | Shen et al. | 719/318 |
| 2009/0049332 | A1* | 2/2009 | Chen et al. | 714/4 |
| 2009/0254775 | A1 | 10/2009 | Coffey | |
| 2009/0327519 | A1* | 12/2009 | Thiel et al. | 709/239 |
| 2010/0064167 | A1* | 3/2010 | Chen et al. | 714/4 |
| 2010/0281307 | A1* | 11/2010 | Ng | 714/40 |

OTHER PUBLICATIONS

Wikipedia—"High-availability Cluster": (downloaded from www.en.wikipedia.org on Mar. 25, 2010).

* cited by examiner

HIGH AVAILABILITY CLUSTER MANAGEMENT FALLOVER METHOD AND TOOL

FALLOVER POLICY MANAGEMENT IN HIGH AVAILABILITY SYSTEMS

BACKGROUND

The disclosures herein relate generally to information handling systems (IHSs), and more specifically, to management of resource failures in an IHS.

Information handling systems (IHSs) include operating systems that execute many useful resources, such as applications and processes. Upon failure of a particular process, application, or node, an IHS may seek recovery from that failure. In response to such failure, a high availability (HA) system may relocate an application or multiple applications from one IHS to a fallover IHS. A fallover IHS, node or machine may take over the application(s) from the failed node and restart those application(s) on the fallover IHS. Fallover resource management is particularly useful and a key feature of high availability (HA) systems. HA systems manage failed resources, and attempt to recover those resources, either within their current node (IHS) or within another node (IHS) of the HA system. An HA system exhibits high efficiency if applications restart quickly and require little or no resource intervention from a user or other entities.

BRIEF SUMMARY

In one embodiment, a cluster fallover method is disclosed that includes providing a cluster that includes at least first and second information handling systems (IHSs) coupled together by a bus, the first IHS including first and second applications, the first IHS including a first high availability cluster manager (HACM), the second IHS including a second HACM, the cluster further including a shared storage that communicates with the first and second IHSs to store IHS state information therefrom, the shared storage communicating with the first and second HACMs. The method also includes dumping, by the first IHS, first IHS state information to the shared storage for storage therein in response to a first IHS failure. The method further includes detecting, by the second HACM, the first IHS failure. The method still further includes accessing most recent first IHS state information from the shared storage, by the second HACM, in response to the first IHS failure. The method also includes deriving, by the second HACM, from the most recent first IHS state information a process trace for a failed process executing in the first IHS at the time of first IHS failure. The method further includes determining, by the second HACM, one of the first and second applications in the first IHS as being a closest fit match to the process trace, thus identifying a particular failed application in the first IHS. In one embodiment, the determining step includes analyzing, by the second HACM, a hierarchy of child processes and parent processes in the process trace for the failed process to determine one of the first and second applications in the first IHS as being a closest fit match to the process trace, thus identifying a particular failed application in the first IHS.

In another embodiment, a cluster of information handling systems (IHSs) is disclosed. The cluster includes a first IHS including a first processor, a first memory, a first high availability cluster manager (HACM), and first and second applications in the first memory. The cluster also includes a second IHS including a second processor, a second memory, and a second high availability cluster manager (HACM). The cluster further includes a bus coupling the first and second IHSs together. The cluster still further includes a shared storage, coupled to the bus, that communicates with the first and second IHSs to store IHS state information therefrom, the shared storage communicating with the first and second HACMs. The first IHS is configured to dump first IHS state information to the shared storage for storage therein in response to a first IHS failure. The second HACM in the second IHS is configured to detect first IHS failure and to access most recent first IHS state information from the shared storage in response to the first IHS failure. The second HACM is configured to derive from the most recent first IHS state information a process trace for a failed process executing in the first IHS at the time of first IHS failure. The second HACM is further configured to determine one of the first and second applications in the first IHS as being a closest fit match to the process trace, thus identifying a particular failed application in the first IHS. In one embodiment, the second HACM is further configured to analyze a hierarchy of child processes and parent processes in the process trace for the failed process to determine one of the first and second applications in the first IHS as being a closest fit match to the process trace, thus identifying a particular failed application in the first IHS.

In yet another embodiment, a computer program product is disclosed. The computer program product includes a computer readable storage medium for use on a first IHS including a first processor, a first memory, a first high availability cluster manager (HACM), and first and second applications in the first memory, and on a second IHS including a second processor, a second memory, and a second high availability cluster manager (HACM), wherein a bus couples the first and second IHSs together and to a shared storage, the shared storage communicating with the first and second HACMs. The computer program product includes first instructions that cause the first IHS to dump first IHS state information to the shared storage in response to a first IHS failure. The computer program product also includes second instructions wherein the second HACM detects first IHS failure and accesses most recent first IHS state information from the shared storage in response to the first IHS failure. The computer program product further includes third instructions wherein the second HACM derives from the most recent first IHS state information a process trace for a failed process executing in the first IHS at the time of first IHS failure. The computer program product still further includes fourth instructions wherein the second HACM determines one of the first and second applications in the first IHS as being a closest fit match to the process trace, thus identifying a particular failed application in the first IHS. The first, second, third and fourth instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
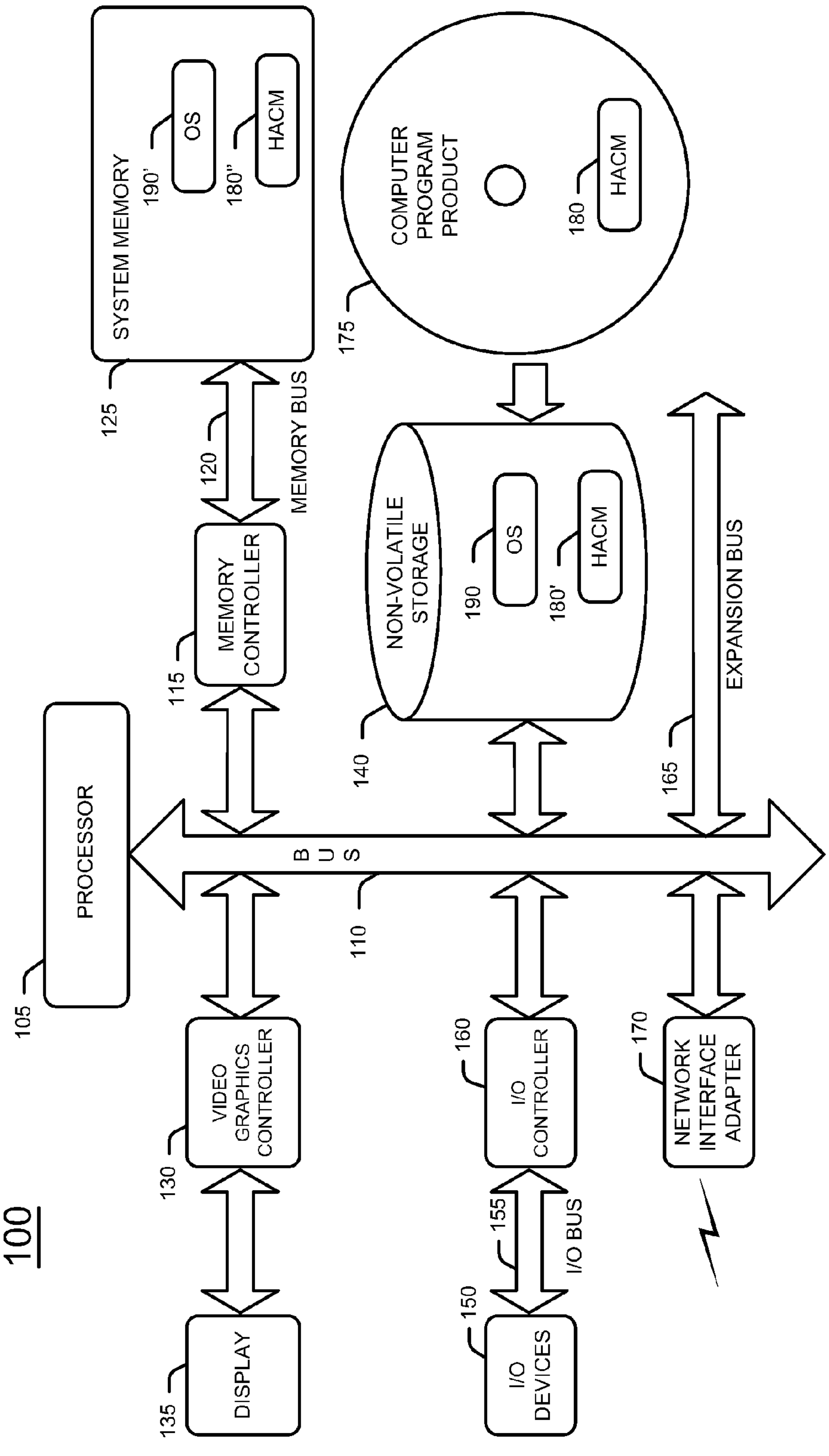
FIG. 1 shows a block diagram of a representative information handling system (IHS) that employs the disclosed high availability cluster manager methodology.

Information handling systems (IHSs) typically employ operating systems that execute applications which include many processes that require execution to accomplish the objectives of the application. These processes may "crash" and cease execution or cause failure or halting of the IHS, node or machine in which they execute. When such a process failure occurs in a high availability cluster (HAC) system, resources of the high availability cluster (HAC) system attempt to remedy that failure quickly. A high availability cluster HAC system is a system that monitors processes, applications, and other resources with a high priority on keeping those resources available to the user and other entities at all times. The HAC may associate a group of processes, such as those of a process trace that includes any process that crashes, with a particular application. That particular application is the "crash-causing application" and the primary cause of a node crash, failure, halt, or lockup. The HAC may cease operation of the crash-causing application, restart the crash-causing application again in the same node, or relocate the crash-causing application to another node in the HAC. For purposes of this document, a "node" is an information handling system (IHS) that executes one or more applications.

A process may have a process identifier or process ID (PID) associated therewith. A particular process may also have a parent process ID associated therewith. The parent process ID provides information about the previous process (i.e. parent process) that initiates the particular process. An HAC may employ a process trace for a particular process that is executing at the time an error occurs in a node of the HAC. The process trace is useful to help identify an application that causes the error in that node. The process trace is a hierarchical history of process parenting that tracks or traces back, process by process, from the particular process through parent processes to determine an original initiating process or root process for the particular process. A root process is the process that initiates the particular process. The HAC uses the process trace to determine the particular application causing failure (i.e. the crash-causing application) in the particular node of the HAC.

The node or IHS in which a particular crash-causing application executes may be the cause of the instability of a particular application. In that case, relocating that application to another node may cause that particular crash-causing application to become stable. When an entire node or IHS fails, an HAC may relocate all of the applications running on that node (i.e. the failed, or crashed node) to another node (i.e. an active or fallover node) in the HAC. Application relocation restores services to the HAC and users or other entities using that HAC. However, at times, the relocation process may cause disruption of services of some or all applications running in the HAC. When possible, it is useful to isolate the failure to a particular crash-causing application and execute recovery services around that particular application. In this manner, HAC resources may benefit from a reduction in disruption effects of the particular crash-causing application.

In other words, it is desirable to quickly and accurately determine the cause of a node failure in an HAC. In one embodiment, the disclosed methodology employs a process trace for the particular process executing at the time of node failure to determine and identify the application that caused the failure. The process trace includes a group of processes, namely the particular process and the parent processes of the particular process and the root process of the particular process. As discussed in more detail below, the HAC accesses the process trace and determines the best fit or best match between the multiple processes in the process trace with an application that executed on the failed node. The best match application is the failed application or crash-causing application within the failed node. With crash-causing application and node information, the HAC may relocate and restart the applications of the failed node and reject, limit, or otherwise restrict the relocation and restart of the particular crash-causing application.

FIG. 1 shows an information handling system 100 with a high availability cluster manager (HACM) 180 software to practice the disclosed high availability cluster manager methodology. IHS 100 includes a processor 105 that may include multiple cores. IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store on nonvolatile storage 145. IHS 100 includes an operating system computer program product on digital media 175 such as a CD, DVD or other media. In one embodiment, a designer or other entity configures the computer program product with high availability cluster manager HACM 180 software to practice the disclosed high availability cluster manager methodology. In practice, IHS 100 may store HACM 180 and OS 190 on nonvolatile storage 145 as HACM 180' and OS 190. When IHS 100 initializes, the IHS loads HACM 180' and OS 190 into system memory 125 for execution as HACM 180" and OS 190', respectively.

As will be appreciated by one skilled in the art, aspects of the disclosed process status determination methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIG. 4 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
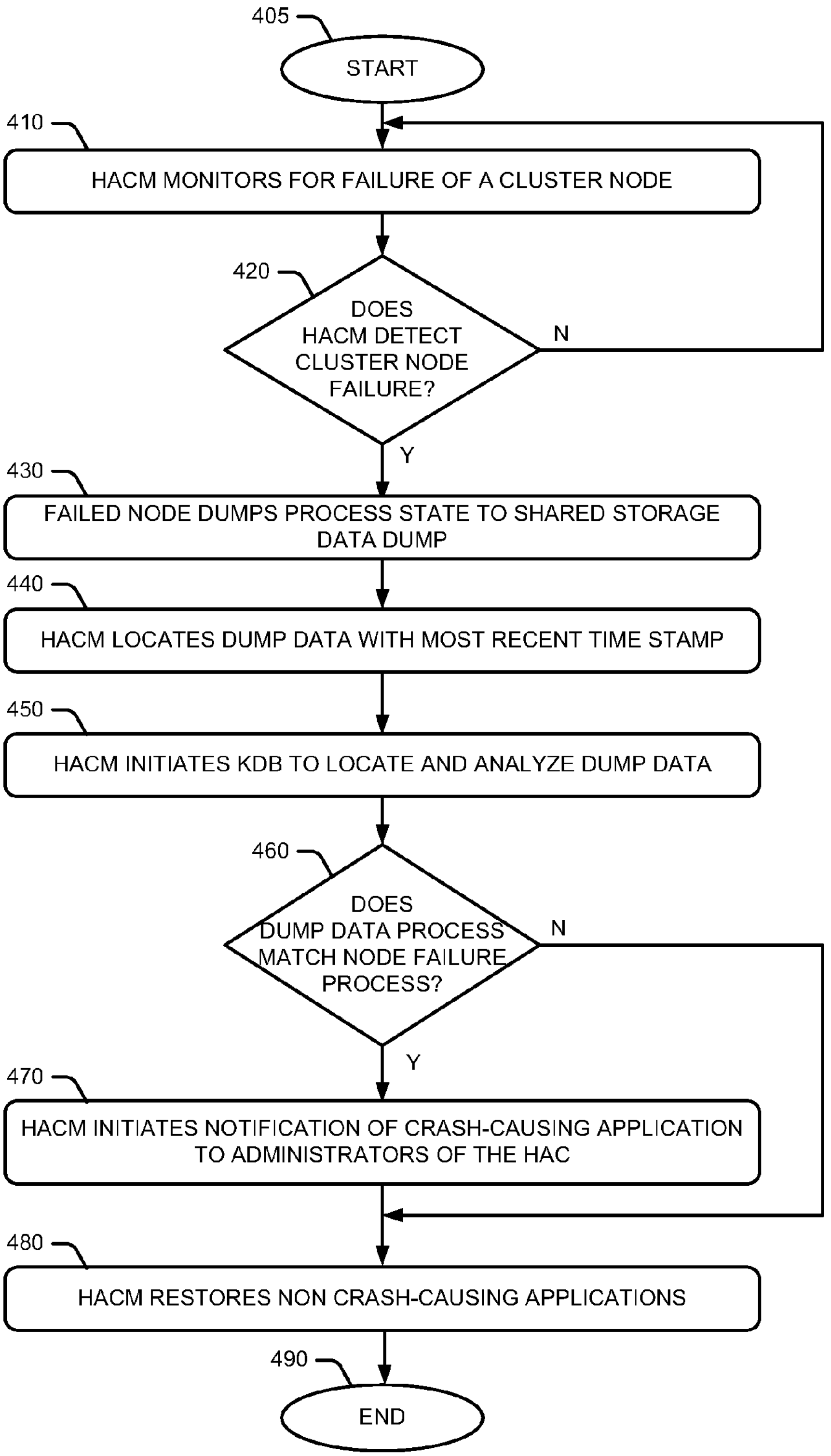
FIG. 4 is a flowchart of an embodiment of the disclosed high availability cluster manager methodology to manage node crash-causing applications.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 described below.

Figure 2:
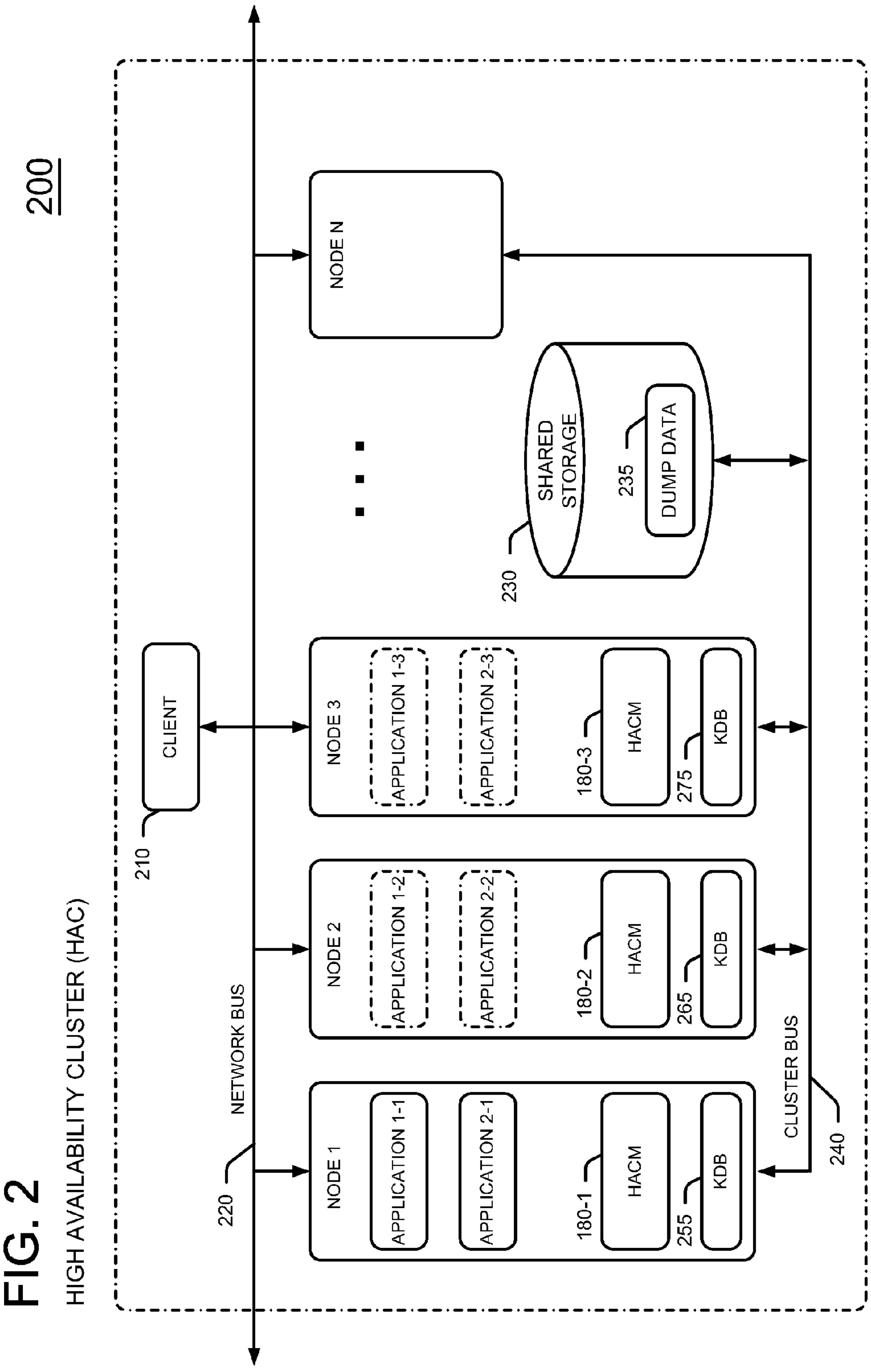
FIG. 2 is a block diagram of a high availability (HA) cluster including an IHS that employs the disclosed high availability cluster manager methodology.

FIG. 2 is a block diagram representation of a high availability cluster (HAC) 200 that a designer or other entity configures with high availability software according to the disclosed high availability cluster manager methodology. HAC 200 includes a client IHS 210 that couples to a network bus 220. HAC 200 may include multiple clients, servers, IHSs or other machines and nodes not shown. Network bus 220 couples to multiple nodes, such as node 1, node 2, node 3, . . . node N, wherein N is the total number of node IHSs in HAC 200. Network bus 220 may couple to external IHSs, such as other systems, servers, or nodes external to HAC 200.

HAC 200 includes a shared storage 230, such as a non-volatile storage that includes storage for dump data 235. Nodes of HAC 200, such as node 1, node 2, node 3, . . . N may store node or IHS state information, such as process trace information in shared storage 230 in the form of dump data 235. In one embodiment of the disclosed high availability cluster manager methodology, nodes of HAC 200, such as node 1, node 2, node 3 . . . N, communicate with shared storage 230 via cluster bus 240. For example, in one embodiment of the disclosed method, each active node may transmit a periodic heartbeat signal to cluster bus 240. When a node fails, the heartbeat signal of that node fails as well. Nodes of HAC 200 may detect a failed node by the lack of heartbeat signal from the failed node on cluster bus 240.

Node 1 is an IHS that employs or executes application software. For example, in one embodiment of the disclosed high availability cluster manager methodology, node 1 includes application 1 and application 2 for execution within node 1. FIG. 2 depicts application 1 executing on node 1 as application 1-1, and application 2 executing on node 1 as application 2-1. A high availability cluster manager (HACM) HACM 180-1 represents the execution of HACM 180 on node 1. Node 1 includes a kernel debugger (KDB) 255 for use by HAC 200 and more particularly by HACM 180-1 in this example of the disclosed high availability cluster manager method.

In one embodiment of the disclosed high availability cluster manager methodology, node 2 includes application 1 and application 2 for execution within node 2 as described in more detail below. Application 1-2 and application 2-2 represent application 1 and application 2 executing in node 2. Application 1-2 and application 2-2 do not execute at the same time as application 1-1 and application 2-1 of node 1. In other words, either application 1-1 executes in node 1, or application 1-2 executes in node 2. In a similar manner, either application 2-1 executes in node 1, or application 2-2 executes in node 2. Node 2 includes a high availability cluster manager HACM 180-2 for execution of the disclosed high availability cluster manager methodology. HACM 180-2 depicts HACM 180 execution on node 2. Node 2 includes a kernel debugger KDB 265 for use by HAC 200 and more particularly by HACM 180-2 in this example of the disclosed high availability cluster manager methodology.

Node 3 may include application 1 and application 2 that execute within node 3 as an application 1-3 and an application 2-3, respectively. Application 1-3 does not execute at the same time as application 1-2 in node 2 or at the same time as application 1-1 in node 1. Only one instance of application 1, either application 1-1 in node 1, application 1-2 in node 2, or application 1-3 in node 3 executes at any given time. In a similar manner, application 2-3 does not execute at the same time as application 2-2 in node 2 or at the same time as application 2-1 in node 1. Only one instance of application 2, either application 2-1 in node 1, application 2-2 in node 2, or application 2-3 in node 3 executes at any given time in HAC 200. The dashed lines around applications 1-2 and 2-2 in node 2 and around applications 1-3 and 2-3 in node 3 indicate that the applications in nodes 2 and 3 are not currently active, but rather applications 1-1 and 2-1 in node 1 are active. If an application fails and causes a particular node to fail, the failing application may move to and become active on another non-failing node, as discussed in more detail below.

Node 3 employs HACM 180-3 for execution of the disclosed high availability cluster manager methodology. Node 3 includes a kernel debugger KDB 275 for use by HAC 200 and more particularly by HACM 180-3 in this example of the disclosed high availability cluster manager methodology. HAC 200 includes a node N that may run applications, such as application 1, application 2 or other applications of HAC 200. As stated above, HAC 200 executes only one instance of application 1 or application 2 at a given time. Node N may represent another node that may execute HACM 180 software as well as other software not shown in HAC 200. HAC 200 may use any node, namely node 1, node 2, . . . N as a fallover node. In this manner, any functional node of HAC 200 may provide a resource to relocate and restart applications from a failed node.

In the event of a process, application, and subsequent node failure, HACM 180 software, such as that of HACM 180-1, HACM 180-2, or HACM 180-3 may initiate the relocation of applications to a fallover node within HAC 200, such as node 1, node 2, . . . N. For example, application 1-1 may fail and become the crash-causing application of node 1. HACM 180-2 of node 2 may initiate the relocation and recovery application process in the disclosed high availability cluster manager methodology. In this manner, application 1-1 and application 2-1 may resume in a new node, such as node 2 or node 3 and continue operation there for the benefit of the user and other entities. In more detail, a particular process executing as part of application 1-1 in node 1 may cease to function properly. That particular process failure may eventually cause application 1-1 to cease functioning properly. The application 1-1 failure may cause node 1 to cease functioning properly. Node 1 may stall, lockup, or otherwise cease proper operation and thus users or other entities that require the particular services of application 1-1 and application 2-1 of node 1 may no longer receive those particular services from node 1.

In one embodiment of the disclosed high availability cluster manager methodology, HACM 180-2 initiates a transfer or relocation of application 1-1 and application 2-1 from node 1 to node 2 and restarts those applications or services. HACM 180-2 may determine that the cause of failure of node 1 was application 1-1 (the crash-causing application) as described in more detail below, and not restart application 1 in node 2. HACM 180-2 may limit the restart of applications 1-1 and application 2-1 from node 1 to only application 2-2 in node 2 and reduce the opportunity of further node failure within HAC 200. In this manner node 2 continues to provide users and other entities of HAC 200 access to services of applications, such as application 2-2.

In another example of application relocation and restart as part of the disclosed high availability cluster manager methodology, HACM 180-2 may try to restart both application 1-1 and application 2-1 within node 2 as application 1-2 and application 2-2. In the event that application 1-1 of node 1 as application 1-2 in node 2 fails again as it did in node 1, HACM 180-3 of node 3 may relocate application 1-1 and/or application 2-1 to node 3 for another restart of one or both applications. As stated above, HAC 200 may allow only one instance of either execution of application 1, or execution of application 2 at any point in time. HACM 180 and other software (not shown) of HAC 200 may cooperate to determine best case scenarios for application selection for relocation and restart. These scenarios may heavily favor the priority of the particular application in question as well as the failed node resource needs in HAC 200. Resources outside of HAC 200 such as those that communicate via network bus 220 may also play a role in determining the application relocation and restart priorities.

When a node fails, such as node 1, that failed node transmits, sends, or otherwise dumps a copy of the node, IHS, or machine state that includes the most current process trace as part of dump data 235, to a shared storage location within HAC 200, such as of shared storage 230. The dump, namely dump data 235, may provide HAC 200 with process, application, resource group and other stack trace information residing in system memory of the failed node, such as system memory 125 of IHS 100, just prior to failure. The dump data 235 corresponds to the machine state of node 1 at the time a particular process in an application fails in node 1 to cause failure of node 1. The dump data includes process trace information for many processes including the most recent dump data for the particular process in node 1 that was executing at the time of failure. Dump data 235 includes valuable information regarding the processes running just prior to node failure for use by software of HAC 200, such as HACM 180-1, HACM 180-2, HACM 180-3 and other software of HAC 200. HACM 180 and other resources of HAC 200 may interpret or otherwise analyze the dump data 235 of shared storage 230 to assist in the determination of application relocation and restart options as demonstrated by the disclosed high availability cluster manager method. In one example, wherein application 1-1 of node 1 causes a failure of node 1, KDB 265 interrogates dump data 235 to determine the process group or process trace that includes a root process as a cause of the node 1 failure. KDB 265 determines from the process trace the particular application, namely application 1-1, as a best fit match of the group of process in the process trace and thus the most likely cause of the node 1 failure.

Figure 3:
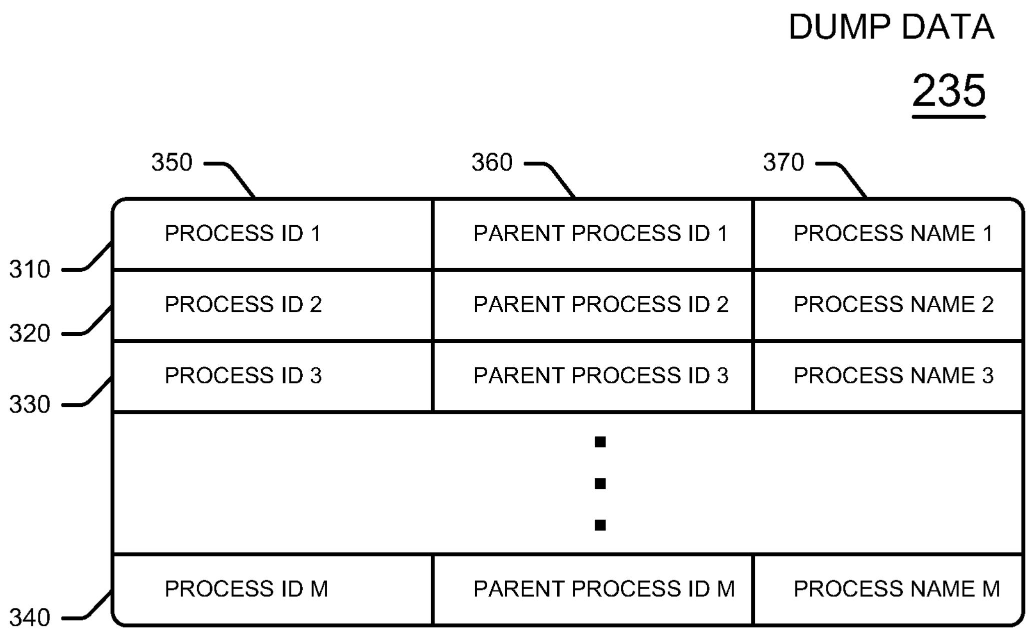
FIG. 3 is a diagram of high availability (HA) dump data that the disclosed high availability cluster manager may employ.

FIG. 3 is a representation of dump data 235 that a user or other resource of HAC 200 may analyze according to the disclosed high availability cluster manager methodology. In one embodiment of the disclosed method, dump data 235 includes the contents of real memory, such as that of system memory 125 (not shown within node 1) or the process state of node 1 at the time of failure, namely at or just prior to the failure of node 1. Dump data 235 represents one example of a node process state or process trace at the time of failure, such as a node 1 failure. Dump data 235 includes a row 310 of data that includes from left to right, process ID 1 in column 350, parent process ID 1 in column 360, and process name 1 in column 370. In this manner, row 310 of dump data 235 provides a particular process ID, parent ID and process name.

Dump data 235 includes a row 320 of data that includes from left to right, process ID 2 in column 350, parent process ID 2 in column 360, and process name 2 in column 370. Dump data 235 further includes a row 330 of data that includes from left to right, process ID 3 in column 350, parent process ID 3 in column 360, and process name 3 in column 370 and so on until as shown, process M information in row 340. Row 340 depicts a row 340 of process data that includes from left to right, process ID M in column 350, parent process ID M in column 360, and process name M in column 370. M indicates the last entry in the dump data 235 process information and the total number of process entries.

Dump data 235 maintains process ID, parent process ID, and process name information in a hierarchical fashion. For example, process ID 3 in row 330, and column 350 corresponds to parent process ID 3 in row 330 and column 360. In this example, parent process ID 3 points to process ID 2 of row 320 and column 350. In other words, the parent process ID of process ID 3 in row 330, and column 350 is process 2 or process ID 2 of row 320 and column 350. The process ID 2 name is process name 2 of row 320 and column 370. Further, the parent process ID 2 of row 320 and column 360 may point to process ID 1 in row 310 and column 350. Finally the parent process ID 1 may indicate "no" parent process, but rather that process 1 or process ID 1 shown in row 310 and column 350 is the root process, originating process or top of the hierarchical structure for this particular grouping of processes. Process name 1 in row 310 and column 370 indicates the name of the root process, namely process name 1. In other words, each of process 3 of row 330 and process 2 of row 320 initiates from the root process, or process 1 of row 310.

In one example of the disclosed high availability cluster manager method, HACM 180 may initiate a relocate and recovery operation within HAC 200 and use the process trace information as shown in FIG. 3 to determine the cause of a particular node failure. HACM 180 may determine by use of that process trace information, the application responsible (crash-causing application) for the failure of a particular node, namely the node responsible for dump data 235 information. In the hierarchy of dump data 235, process name 3 is a child process of process name 2, and process name 2 is a parent process of process name 3. Process name 2 is a child process of process name 1 and process name 1 is a parent process of child process 2. Process name 1 is the root process of the entire process trace shown in the dump data 235 of FIG. 3.

In one embodiment of the disclosed high availability cluster manager methodology, process name M in row 340 is executing at the time of a node failure. In other words, process name M and those processes that link hierarchically with process M are the ultimate cause of the failure of a particular node. The application that is most closely associated with process name M and the process trace, or hierarchical grouping of processes corresponding to process name M is the crash-causing application or failed application. HACM 180-2 by employing KDB 265 starts at the bottom row of dump data 235 of FIG. 3, namely process name M, and traces from child process to parent process, row by row upwardly, until locating process ID 1 and process name 1. This hierarchical grouping of processes, namely the process trace, includes that process group associated with the failure of a particular node. The process trace includes process M . . . process 3, process 2 and process 1, wherein process M is the process executing on the failed node at the time of node failure, process 3 and process 2 are parent processes of process M, and process 1 is the root process. In other words, the process group associated with the process trace includes process M . . . process 3, process 2 and process 1. Since applications may share processes within HAC 200, HACM 180-2 determines the best fit or match between the group of processes of the process trace and the applications that executed on the failed node. The best match application corresponds to the crash-causing application.

The flowchart of FIG. 4 illustrates the architecture, functionality, and operation of possible implementations of systems, methods and computer program products that perform high availability fallover in accordance with various embodiments of the present invention. In this regard, each block in the flowchart of FIG. 4 may represent a module, segment, or portion of code, which comprises one or more executable instructions for implementing the specified logical function(s). It should also be noted that, in some alternative implementations, the functions noted in the block may occur out of the order noted in FIG. 4. For example, two blocks shown in succession may, in fact, be executed substantially concurrently, or the blocks may sometimes be executed in the reverse order, depending upon the functionality involved. It will also be noted that each block of FIG. 4 and combinations of blocks in the block diagrams and/or flowchart illustration, can be implemented by special purpose hardware-based systems that perform the specified functions or acts, or combinations of special purpose hardware and computer instructions.

FIG. 4 is a flowchart that shows process flow in an embodiment of the disclosed methodology that tests to determine if a particular node in a high availability cluster HAC fails. More specifically, the flowchart of FIG. 4 shows how the embedded high availability cluster manager HACM 180 of FIG. 1 tests to determine the particular processes and thereby the corresponding particular application that causes the node failure. The disclosed high availability cluster manager method starts, as per block 405. In one embodiment, HACM 180, and more specifically HACM 180-2 as shown in FIG. 2, monitors for failure of a cluster node of HAC 200, as per block 410. Decision block 420 demonstrates this test. If the test, as shown per block 420 determines that a cluster node of HAC 200 does not fail, then HACM 180-2 continues monitoring for cluster node failures, as per block 410. Process flow then continues to block 420 where the method may continue to check the status of other nodes within HAC 200.

If a cluster node fails or halts, as shown in decision block 420, that particular node dumps or transfers the state of that node, or machine process state to a shared storage 230 of HAC 200, as per block 430. In one embodiment of the disclosed high availability cluster manager methodology, the failed node dumps the real memory, such as system memory 125, that includes the process trace of that particular node to shared storage 230 as dump data 235. In one example, node 1 fails and dumps node 1 state information into shared storage 230 as dump data 235. In this example, node 1 fails or halts and HAC 200 resources may benefit from immediate recovery of the process resources now frozen in node 1. For example, if node 1 was executing application 1 as application 1-1 and application 2 as application 2-1 just prior to failure, HAC 200 desires immediate recovery of application 1 and application 2 resources for user and other entities of HAC 200.

Shared storage 230 may contain multiple node dump data and HAC 200 locates dump data coincident to a particular node and failure. HACM 180-2 locates dump data 235 coincident with a most recent time stamp, as per block 440. In this manner, dump data 235 corresponds to the most recent cluster node failure. For example, if node 1 fails, HACM 180-2 locates dump data 235 that includes node 1 state information relevant to the failure of node 1.

HACM 180 triggers kernel debugger KDB software in a still operative receiving node to locate and analyze dump data 235, as per block 450. For example, HACM 180-2 in node 2 may initiate KDB 265 to analyze dump data 235 that includes process state data for node 1. In this manner HACM 180, and more specific to the example, HACM 180-2 interrogates the failure process data of node 1. HACM 180 performs a test to determine if dump data 235 includes a process that matches the node failure process, as per block 460. For example HACM 180-2 interrogates the contents of dump data 235 with KDB 265 resources to determine if dump data 235 matches the process failure data of node 1. KDB 265 may use the hierarchical nature of dump data 235 as described above, to determine if the process trace data of dump data 235 points to a particular application, such as application 1-1 of node 1 that is thus responsible for the failure of node 1. In this example, application 1-1 becomes the crash-causing application.

If the test as shown in decision block 460 results in a process match, HACM 180 initiates a notification of the crash-causing application to administrators and other entities of the HAC 200, as per block 470. For example, HACM 180-2 may determine that process M, namely that process of process ID M shown in FIG. 3 row 340, and column 350 is the ID of the process at time of the node 1 failure. KDB 265 may further determine from the analysis of dump data 235 that process ID M is part of a hierarchical process trace that includes process name 1 shown in FIG. 3 row 310, and column 350. KDB identifies application 1 as the best fit, or most likely application associated with the process trace of dump data 235. In that case, HACM 180-2 initiates a notification of application 1, or more specifically application 1-1 of node 1 as the crash-causing application, to resources of HAC 200.

In one embodiment of the disclosed design, that notification may extend of other resources outside of HAC 200 that may couple to HAC 200 via network bus 220. After the crash-causing application notification, or if the process match test as shown in block 460 does not match, HACM 180 restores the non crash-causing applications, as per block 480. The non crash-causing applications may also be called non-failed applications. In one embodiment, HACM 180 restores the non crash-causing applications on node 1 after re-initializing node 1.

HACM 180-2 may relocate application 2-1 of node 1 to application 2-2 of node 2 and restart that application. In this manner, entities of HAC 200 gain immediate access to the resources of application 2 execution. However, since application 1-1 is known to be the crash-causing application and failure cause of node 1, HACM 180-2 may not restart application 1-1 as application 1-2 in node 2. HACM 180-2 may not restart application 1 for concern that it may cause the failure of node 2 as well. In other embodiments of the disclosed high availability cluster manager methodology, HACM 180-2 or other HACM 180 software may allow crash-causing applications to relocate and restore as priorities and rules dictate within HAC 200.

For example, HACM 180-2 may restart application 1-1 as application 1-2 in node 2 and give application 1 another execution opportunity. This may occur if application 1 is a much needed and valuable resource to HAC 200. If application 1 fails again, HACM 180 resources of HAC 200 may restart application 1 again in another node, such as node 3 as application 1-3. Many perturbations and combinations of application relocation and restart are possible by using rules within HACM 180 or other software (not shown) within HAC 200. Although the testing of node failures and restoration of application resources may continue as long as HAC 200 is active, for this embodiment, the disclosed high availability cluster manager methodology ends, as per block 490.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of fallover, comprising:

providing a cluster that includes at least first and second information handling systems (IHSs) coupled together by a network bus, the first IHS including first and second applications, the first IHS including a first high availability cluster manager (HACM), the second IHS including a second HACM, the cluster further including a shared storage that communicates with the first and second IHSs to store IHS state information therefrom, the shared storage communicating with the first and second HACMs;

dumping, by the first IHS, first IHS state information to the shared storage for storage therein in response to a first IHS failure, wherein the first IHS failure is an application failure;

detecting, by the second HACM, the first IHS failure, wherein the first IHS failure is an application failure;

accessing most recent first IHS state information from the shared storage, by the second HACM, in response to the first IHS failure, wherein the first IHS failure is an application failure;

deriving, by the second HACM, from the most recent first IHS state information a process trace for a failed process executing in the first IHS at the time of first IHS failure, wherein the first IHS failure is an application failure; and determining, by the second HACM, one of the first and second applications in the first IHS as being a closest fit match to the process trace, wherein the determining includes analyzing, by the second HACM, a hierarchy of child processes and parent processes in the process trace for the failed process to determine one of the first and second applications in the first IHS as being a closest fit match to the process trace, thus identifying a particular failed application in the first IHS as the first IHS failure, wherein the first IHS failure is an application failure.

2. The method of claim 1, further comprising coupling the first and second IHSs to the shared storage by a cluster bus.

3. The method of claim 1, further comprising moving, by the second HACM, the particular failed application from the first IHS to the second IHS.

4. The method of claim 1, further comprising restoring non-failed applications on the first IHS upon moving the particular failed application to the second IHS and re-initializing the first IHS.

5. The method of claim 1, further comprising restoring the particular failed application on the first IHS at least once even though the failed application caused the first IHS failure, the restoring of the particular failed application being in response to notifying by the second HACM that the first IHS failed, wherein the first IHS failure is an application failure.

6. The method of claim 1, further comprising notifying, by the second HACM, a third IHS in the cluster that the first IHS failed.

7. The method of claim 1, further comprising notifying, by the second HACM, a third IHS outside of the cluster that the first IHS failed.

8. A cluster of information handling systems (IHSs), comprising:

a first IHS including a first processor, a first memory, a first high availability cluster manager (HACM), and first and second applications in the first memory;

a second IHS including a second processor, a second memory, and a second high availability cluster manager (HACM);

a network bus coupling the first and second IHSs together; and a shared storage, that communicates with the first and second IHSs to store IHS state information therefrom, the shared storage communicating with the first and second HACMs;

the first IHS being configured to dump first IHS state information to the shared storage for storage therein in response to a first IHS failure, wherein the first IHS failure is an application failure;

the second HACM in the second IHS being configured to detect first IHS failure and to access most recent first IHS state information from the shared storage in response to the first IHS failure, wherein the first IHS failure is an application failure;

the second HACM being configured to derive from the most recent first IHS state information a process trace for a failed process executing in the first IHS at the time of first IHS failure, wherein the first IHS failure is an application failure;

the second HACM being further configured to determine one of the first and second applications in the first IHS as being a closest fit match to the process trace, wherein the determining includes analyzing, by the second HACM, a hierarchy of child processes and parent processes in the process trace for the failed process to determine one of the first and second applications in the first IHS as being a closest fit match to the process trace, thus identifying a particular failed application in the first IHS, as the first IHS failure, wherein the first IHS failure is an application failure.

9. The cluster of claim 8, further comprising coupling the first and second IHSs to the shared storage by a cluster bus.

10. The cluster of claim 8, wherein the second HACM moves the particular failed application from the first IHS to the second IHS.

11. The cluster of claim 8, wherein the second HACM restores non-failed applications on the first IHS upon moving the particular failed application to the second IHS and re-initializing the first IHS.

12. The cluster of claim 8, wherein the second HACM restores the particular failed application on the first IHS at least once even though the failed application caused the first IHS failure, the restoring of the particular failed application being in response to notifying by the second HACM that the first IHS failed, wherein the first IHS failure is an application failure.

13. The cluster of claim 8, wherein the second HACM notifies a third IHS in the cluster that the first IHS failed.

14. The cluster of claim 8, wherein the second HACM notifies a third IHS outside of the cluster that the first IHS failed.

15. A computer program product, comprising:

a computer readable storage medium for use on a first IHS including a first processor, a first memory, a first high availability cluster manager (HACM), and first and second applications in the first memory, and on a second IHS including a second processor, a second memory, and a second high availability cluster manager (HACM), wherein the first and second IHSs couple by a network bus, wherein the first and second IHSs couple to a shared storage, the shared storage communicating with the first and second HACMs;

first instructions that cause the first IHS to dump first IHS state information to the shared storage in response to a first IHS failure, wherein the first IHS failure is an application failure;

second instructions wherein the second HACM detects first IHS failure, wherein the first IHS failure is an application failure, and accesses most recent first IHS state information from the shared storage in response to the first IHS failure, wherein the first IHS failure is an application failure;

third instructions wherein the second HACM derives from the most recent first IHS state information a process trace for a failed process executing in the first IHS at the time of first IHS failure, wherein the first IHS failure is an application failure; and fourth instructions wherein the second HACM determines one of the first and second applications in the first IHS as being a closest fit match to the process trace, wherein the fourth instructions include instructions that analyze, by the second HACM, a hierarchy of child processes and parent processes in the process trace for the failed process to determine one of the first and second applications in the first IHS as being a closest fit match to the process trace, thus identifying a particular failed application in the first IHS as the first IHS failure, wherein the first IHS failure is an application failure;

wherein the first, second, third and fourth instructions are stored on the computer readable storage medium.

16. The computer program product of claim 15, further comprising fifth instructions that couple the first and second IHSs to the shared storage by a cluster bus.

17. The computer program product of claim 15, further comprising sixth instructions wherein the second HACM moves the particular failed application from the first IHS to the second IHS.

18. The computer program product of claim 15, further comprising seventh instructions wherein the second HACM restores non-failed applications on the first IHS upon moving the particular failed application to the second IHS and re-initializing the first IHS.

19. The computer program product of claim 15, further comprising eighth instructions wherein the second HACM restores the particular failed application on the first IHS at least once even though the failed application caused the first IHS failure, the restoring of the particular failed application being in response to notifying by the second HACM that the first IHS failed, wherein the first IHS failure is an application failure.

20. The computer program product of claim 15, further comprising ninth instructions wherein the second HACM notifies a third IHS in the cluster that the first IHS failed.

* * * * *